United States Patent
Sato

(10) Patent No.: US 7,663,816 B2
(45) Date of Patent: Feb. 16, 2010

(54) WIDE-ANGLE LENS AND IMAGING APPARATUS

(75) Inventor: Haruo Sato, Kawaguchi (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 12/186,477

(22) Filed: Aug. 5, 2008

(65) Prior Publication Data

US 2009/0086340 A1    Apr. 2, 2009

(30) Foreign Application Priority Data

Sep. 28, 2007    (JP)    ............................. 2007-254903

(51) Int. Cl.
G02B 9/04    (2006.01)

(52) U.S. Cl. ...................................... 359/794; 359/793

(58) Field of Classification Search ......... 359/754–757, 359/759, 760, 763, 764, 767–769, 771, 772, 359/779, 780, 784, 791–794

See application file for complete search history.

(56) References Cited

U.S. PATENT DOCUMENTS

| 5,589,988 | A | 12/1996 | Suenaga |
| 2009/0059393 | A1 | 3/2009 | Obama |

FOREIGN PATENT DOCUMENTS

| JP | 63-61213 A | 3/1988 |
| JP | 6-308385 A | 11/1994 |
| JP | 11-211978 A | 8/1999 |

*Primary Examiner*—Darryl J Collins
(74) *Attorney, Agent, or Firm*—Miles & Stockbridge P.C.

(57) ABSTRACT

Providing a large aperture wide-angle lens having high optical performance with sufficiently suppressed spherical aberration and sagittal coma flare, and an imaging apparatus using the lens. The lens including, in order from an object, a first lens group having positive refractive power, and a second lens group having positive refractive power, the second lens group being movable for focusing and including a 21 lens component having positive refractive power, a 22 lens component having negative refractive power, a 23 lens component having positive refractive power, and a 24 lens component having positive refractive power, and given conditions being satisfied.

37 Claims, 9 Drawing Sheets

WIDE-ANGLE LENS AND IMAGING APPARATUS

The disclosure of the following priority application is herein incorporated by reference:

Japanese Patent Application No. 2007-254903 filed on Sep. 28, 2007.

BACKGROUND OF THE INVENTION

1. Field of the Invention

The present invention relates to a wide-angle lens suitable for an image-taking lens for a single-lens reflex digital camera, a film camera and a video camera, and an imaging apparatus.

2. Related Background Art

There has been proposed a large aperture wide-angle lens such as Japanese Patent Application Laid-Open No. 6-308385.

However, in the conventional large aperture wide-angle lens disclosed in Japanese Patent Application Laid-Open No. 6-308385, there has been plenty room for improvement of aberrations such as variation in spherical aberration with respect to the wavelength, astigmatism, sagittal coma flare.

SUMMARY OF THE INVENTION

The present invention is made in view of the above-described problems, and has an object to provide a large aperture wide-angle lens having high optical performance with excellently correcting sagittal coma, and an imaging apparatus using the wide-angle lens.

According to a first aspect of the present invention, there is provided a wide-angle lens comprising, in order from an object: a first lens group having positive refractive power; and a second lens group having positive refractive power; the second lens group including, in order from the object, a 2A lens component having positive refractive power and movable for focusing on the object, a 2B lens component having negative refractive power and movable for focusing on the object, a 2C lens component having positive refractive power and movable for focusing on the object, and a 2D lens component having positive refractive power and movable for focusing on the object, and the following conditional expression being satisfied:

$$1.00 < f23/f24 < 5.00$$

where f23 denotes a focal length of the 2C lens component, and f24 denotes a focal length of the 2D lens component.

According to a second aspect of the present invention, there is provided an imaging apparatus equipped with the wide-angle lens according to the first aspect.

According to a third aspect of the present invention, there is provided a method for forming an image of an object by a wide-angle lens comprising steps of: providing the wide-angle lens including, in order from the object, a first lens group having positive refractive power, and a second lens group having positive refractive power, the second lens group including, in order from the object, a 2A lens component having positive refractive power, a 2B lens component having negative refractive power, a 2C lens component having positive refractive power, and a 2D lens component having positive refractive power; moving the 2A lens component, the 2B component, the 2C component and 2D component upon focusing; and satisfying the following conditional expression:

$$1.00 < f23/f24 < 5.00$$

where f23 denotes a focal length of the 2C lens component, and f24 denotes a focal length of the 2D lens component.

The present invention makes it possible to provide a large aperture wide-angle lens suitable for an imaging apparatus such as a single-lens reflex camera, and an imaging apparatus using the wide-angle lens.

DESCRIPTION OF THE MOST PREFERRED EMBODIMENT

Figure 1:
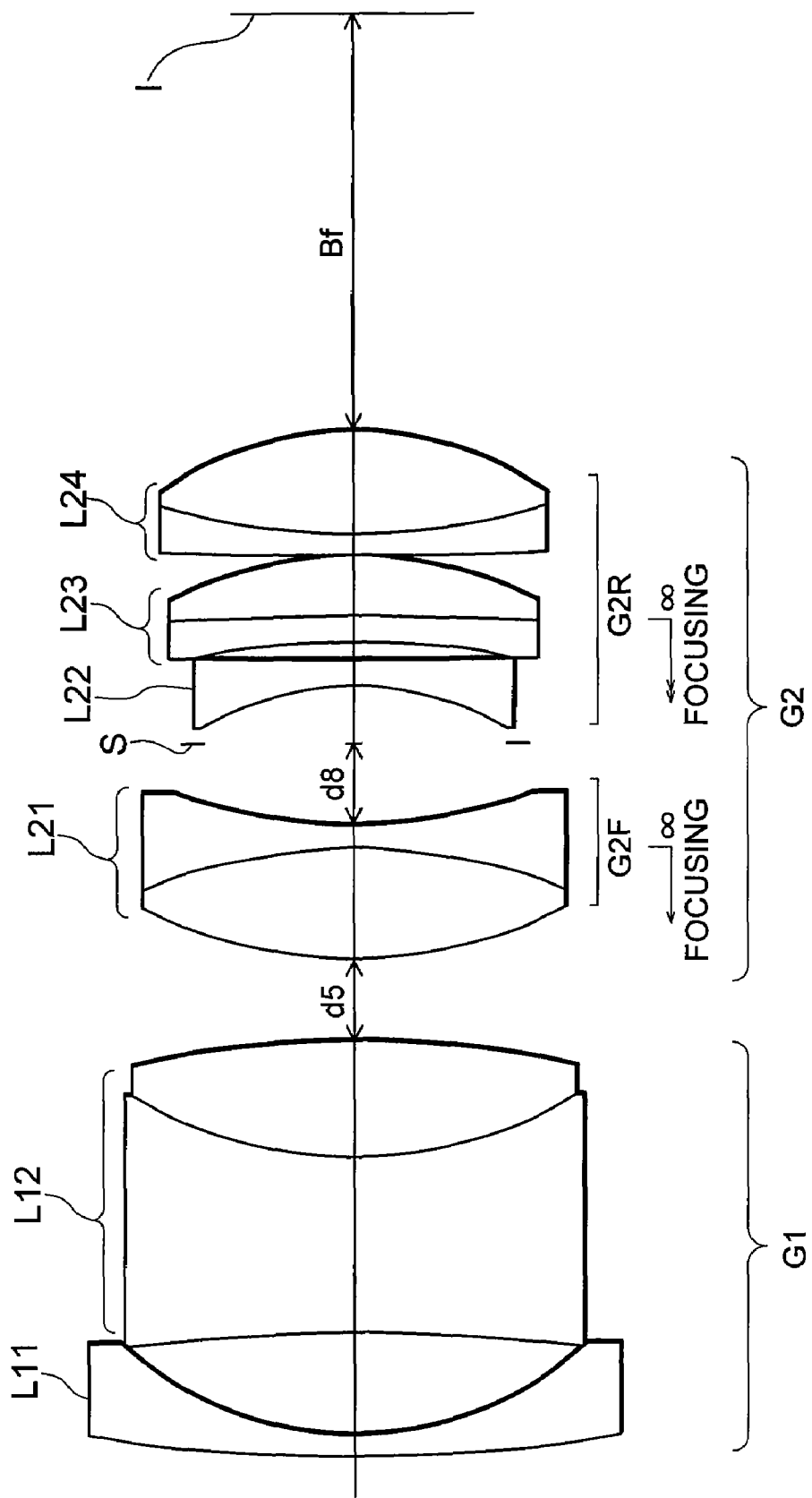
FIG. 1 is a sectional view showing a lens configuration of a wide-angle lens according to Example 1 upon focusing on infinity.

A wide-angle lens according to the present embodiment is explained below.

A wide-angle lens according to the present embodiment includes, in order from an object, a first lens group having positive refractive power, and a second lens group having positive refractive power. The second lens group, which is movable upon focusing, includes, in order from the object, a 21 lens component having positive refractive power, a 22 lens component having negative refractive power, a 23 lens component having positive refractive power, and a 24 lens component having positive refractive power. The following conditional expression (1) is satisfied:

$$1.00 < f23/f24 < 5.00 \qquad (1)$$

where f23 denotes a focal length of the 23 lens component, and f24 denotes a focal length of the 24 lens component.

Generally, the most difficult problem in designing objective optical system including photographing lens is to design the system to be a larger aperture and a wider angle of view simultaneously. This means nothing other than exhaustively correcting Seidel aberrations. Moreover, the larger the aperture becomes, the more difficult to simultaneously correct spherical aberration and sagittal coma, and astigmatism. The present embodiment has conspicuous characteristics having high optical performance with securing sufficient peripheral quantity of light without making the lens excessively large, with excellently correcting spherical aberration, variation in spherical aberration with respect to the wavelength, astigmatism, and sagittal coma without increasing meridional coma.

Conditional expression (1) defines an appropriate range of the ratio of the focal length of the 23 lens component L23 to that of the 24 lens component L24 in the second lens group G2. Conditional expression (1) shows that refractive power of the 24 lens component is preferably larger than that of the 23 lens component. Moreover, it shows excellent correction of spherical aberration and degree of reduction in sagittal coma flare.

When the ratio f23/f24 is equal to or exceeds the upper limit of conditional expression (1), refractive power distribution of positive lens components of the second lens group becomes excessively unbalanced, so that correction of spherical aberration, meridional coma becomes worse.

When the upper limit of conditional expression (1) is set to 4.00 or less, it becomes advantageous for correcting spherical aberration and meridional coma. Moreover, when the upper limit of conditional expression (1) is set to 3.50 or 3.00 or less, the effect of the present embodiment can be fully shown.

On the other hand, when the ratio f23/f24 is equal to or falls below the lower limit of conditional expression (1), this means refractive power of the 23 lens component L23 becomes larger than that of the 24 lens component L24. In the case of the lens configuration of the present embodiment, in order to reduce spherical aberration and sagittal coma, strong positive refractive power of the 24 lens component L24 is indispensable. Accordingly, when the ratio f23/f24 is equal to or falls below the lower limit of conditional expression (1), it becomes disadvantageous to thoroughly reduce spherical aberration and sagittal coma flare, so that it is undesirable.

When the lower limit of conditional expression (1) is set to 1.10 or more, it becomes effective to reduce sagittal coma flare. Moreover, when the lower limit of conditional expression (1) is set to 1.15 or 1.20 or more, the effect of the present embodiment can be fully shown.

The 23 lens component is preferably constructed by a single lens or a cemented lens. With this configuration, it becomes possible to make the wide-angle lens compact.

The 24 lens component is preferably constructed by a single lens or a cemented lens. With this configuration, it becomes possible to make the wide-angle lens compact.

The 21 lens component is preferably a cemented positive lens constructed by a positive lens cemented with a negative lens. With the configuration, it becomes possible to make the wide-angle lens compact.

The first lens group preferably includes, in order from the object, a 11 lens component having negative refractive power, and a 12 lens component having positive refractive power. With this lens configuration, since the first lens group functions as a converter having afocal or a weak positive refractive power, bundle of rays incident on the master lens does not diverge, so that it becomes possible to prevent the master lens from getting excessively large.

The 11 lens component is preferably constructed by a negative lens. With this configuration, it becomes possible to make the wide-angle lens compact.

The 12 lens component is preferably a cemented positive lens constructed by a negative lens cemented with a positive lens. With this configuration, it becomes possible to make the wide-angle lens compact.

In a wide-angle lens according to the present embodiment, the following conditional expression (2) is preferably satisfied:

$$-1.00 < (r2+r1)/(r2-r1) \leq 0.00 \qquad (2)$$

where r1 denotes a radius of curvature of the object side surface of the positive lens in the 24 lens component, and r2 denotes a radius of curvature of the image side surface of the positive lens in the 24 lens component.

Conditional expression (2) defines an appropriate range of a shape factor (Q factor) of the positive lens in the 24 lens component L24. When conditional expression (2) is shown by the shape, the shape of the positive lens in the 24 lens component comes to a rang from a plano-convex lens having a convex surface facing the image to a double convex positive lens. When the Q factor is varied by bending, generated aberrations vary largely. Accordingly, this affects correction in mainly spherical aberration, upper coma, and sagittal coma flare.

When the value (r2+r1)/(r2−r1) exceeds the upper limit of conditional expression (2), the convex shape of the object side of the positive lens in the 24 lens component L24 becomes stronger than the convex shape of the image side. Upon taking such a shape, it becomes difficult to correct upper coma in particular.

When the upper limit of conditional expression (2) is set to −0.10 or less, it becomes advantageous to correct upper coma. Moreover, when the upper limit of conditional expression (2) is set to −0.15 or −0.20 or less, the effect of the present embodiment can be fully shown.

On the other hand, when the value (r2+r1)/(r2−r1) is equal to or falls below the lower limit of conditional expression (2), the shape of the positive lens in the 24 lens component becomes a meniscus shape having a convex surface facing the image. In the case of the present embodiment, it becomes disadvantageous to correct sagittal coma. Moreover, spherical aberration becomes worse, so that it is undesirable.

When the lower limit of conditional expression (2) is set to −0.96 or more, it becomes advantageous to correct spherical aberration. Moreover, when the lower limit of conditional expression (2) is set to −0.94 or −0.80 or more, the effect of the present embodiment can be fully shown.

In a wide-angle lens according to the present embodiment, in order to realize a large aperture wide-angle lens having high optical performance with a minimum number of lenses, it is preferable to use an aspherical surface. In particular, using an aspherical surface on the object side concave surface of the 23 lens component is effective to excellently correct spherical aberration, upper coma, and sagittal coma flare, so that it is desirable.

In a wide-angle lens according to the present embodiment, the 23 lens component L23 is preferably a cemented lens. With this configuration, it becomes possible to excellently correct chromatic aberration. In the case of a glass mold aspherical lens, since the glass material has a certain restriction, the configuration is also advantageous to correct lateral chromatic aberration and longitudinal chromatic aberration.

In a wide-angle lens according to the present embodiment, the following conditional expression (3) is preferably satisfied:

$$1.51 < n22 < 1.85 \qquad (3)$$

where n22 denotes a refractive index of the negative lens in the 22 lens component at d-line (wavelength λ=587.6 nm).

Conditional expression (3) is for setting the refractive index of the negative lens in the 22 lens component L22 at d-line to an optimum value.

When the value n22 is equal to or exceeds the upper limit of conditional expression (3), Petzval sum becomes too large, so that it becomes difficult to correct curvature of field and astigmatism. In an ordinary optical glass, when the refractive index exceeds 1.85, it is often the case that dispersion also becomes extremely large. Accordingly, spherical aberration of color (spherical aberration correction curve with respect to the wavelength) that is a cause of color drift, which comes into question in digital photography, generates, in particular, spherical aberration with respect to g-line largely generates in positive direction, so that it is undesirable.

When the value n22 is equal to or falls below the lower limit of conditional expression (3), curvature of the concave surface of the negative lens in the 22 lens component L22 becomes extremely strong, and spherical aberration and sagittal coma flare become worse, so that it is undesirable.

When the lower limit of conditional expression (3) is set to 1.6 or more, generation of sagittal coma flare can be further suppressed. When the lower limit of conditional expression (3) is set to 1.65 or 1.70 or more, the effect of the present embodiment can be fully shown.

In a wide-angle lens according to the present embodiment, the first lens group G1 includes, in order from the object, a 11 lens component L11 composed of a negative lens, and a 12 lens component L12 composed of a cemented positive lens constructed by a negative lens cemented with a positive lens, and the following conditional expression (4) is preferably satisfied:

$$0.012 < f/f1 < 0.100 \tag{4}$$

where f1 denote a focal length of the first lens group G1, and f denotes a focal length of the wide-angle lens.

Conditional expression (4) defines an appropriate range of the value that refractive power of the first lens group G1 is normalized by the refractive power of the wide-angle lens.

When the value f/f1 is equal to or exceeds the upper limit of conditional expression (4), the focal length of the first lens group G1 becomes short, in other words, refractive power of the first lens group G1 becomes extremely large. In a front converter of a retrofocus lens, when positive refractive power becomes strong, the focal length of the wide-angle lens becomes large, and the back focal length becomes short. Moreover, lower coma becomes worse, so that it is undesirable.

When the upper limit of conditional expression (4) is set to 0.08 or less, it is advantageous to secure sufficient back focal length and to correct off-axis aberrations. When the upper limit of conditional expression (4) is set to 0.05 or 0.04 or less, the effect of the present embodiment can be fully shown.

On the other hand, when the value f/f1 is equal to or falls below the lower limit of conditional expression (4), this means that refractive power of the first lens group G1 becomes weaker than the optimum value in the present embodiment. In this case, the effect of the first lens group G1 that corrects spherical aberration generated by the second lens group G2 becomes weak. As a result, correction of spherical aberration becomes worse, so that it is undesirable.

When the lower limit of conditional expression (4) is set to 0.014 or more, it becomes possible to excellently correct spherical aberration. When the lower limit of conditional expression (4) is set to 0.015 or 0.016 or more, the effect of the present embodiment can be fully shown.

In a wide-angle lens according to the present embodiment, the following conditional expression (5) is preferably satisfied:

$$0.31 < Dn/D1 < 0.50 \tag{5}$$

where D1 denotes a thickness of the first lens group along the optical axis, and Dn denotes a thickness of the negative lens in the 12 lens component along the optical axis.

Conditional expression (5) defines a condition that the thickness of the negative lens in the 12 lens component along the optical axis is normalized by the thickness of the first lens group. The thick negative lens makes the entrance pupil locate more to the object side, so that it becomes effective for the diameter and the filter size of the lens to be smaller. Moreover, in view of correcting aberrations, despite of very small number of lenses, it becomes effective to correct off-axis aberrations such as curvature of field and distortion in a well balanced manner. Conditional expression (5) defines an optimum value of the thickness of the thick negative lens.

When the ratio Dn/D1 is equal to or exceeds the upper limit of conditional expression (5), whole of the lens becomes excessively heavy, so that it is undesirable. Moreover, difficulty level of the polishing becomes higher resulting in cost increase, so that it is undesirable. Moreover, the thickness of the positive lens in the 12 lens component cannot be sufficiently secured, so that spherical aberration cannot be corrected well.

When the upper limit of conditional expression (5) is set to 0.48 or less, the weight of the lens can be lighter, and cost can be reduced, so that it is desirable. Furthermore, when the upper limit of conditional expression (5) is set to 0.45 or 0.44 or less, the effect of the present embodiment can be fully shown.

On the other hand, when the ratio Dn/D1 is equal to or falls below the lower limit of conditional expression (5), the effect described above cannot be attained, and the diameter of the lens becomes large, the filter size becomes large, and the number of the lenses increases, so that it is undesirable.

When the lower limit of conditional expression (5) is set to 0.33 or more, the diameter of the front lens can be smaller, so that it is preferable. Furthermore, when the lower limit of conditional expression (5) is set to 0.35 or 0.36 or more, the effect of the present embodiment can be fully shown.

In a wide-angle lens according to the present embodiment, the 24 lens component is preferably a cemented lens. With this lens configuration, it becomes possible to effectively optimize Petzval sum and to correct sagittal coma flare.

In a wide-angle lens according to the present embodiment, the following conditional expression (6) is preferably satisfied:

$$1.000 < n24P/n24N < 1.200 \tag{6}$$

where n24N denotes a refractive index of the negative lens in the 24 lens component at d-line in which wavelength $\lambda = 587.6$ nm, and n24P denotes a refractive index of the positive lens in the 24 lens component at d-line in which wavelength $\lambda = 587.6$ nm.

Conditional expression (6) defines an appropriate range of the ratio of the refractive index of the positive lens to that of the negative lens in the 24 lens component. When the ratio satisfies conditional expression (6), it becomes possible to realize a large aperture wide-angle lens having higher optical performance with fewer variation in the shape of spherical aberration with respect to the wavelength (spherical aberration in colors), astigmatism, and sagittal coma flare.

When the ratio n24P/n24N is equal to or exceeds the upper limit of conditional expression (6), spherical aberration becomes worse, so that it is undesirable.

When the upper limit of conditional expression (6) is set to 1.150 or less, it becomes possible to optimize Petzval sum and to excellently correct curvature of field, so that it is preferable. Furthermore, when the upper limit of conditional expression (6) is set to 1.100 or less, the effect of the present embodiment can be fully shown.

On the other hand, when the ratio n24P/n24N is equal to or falls below the lower limit of conditional expression (6), it becomes difficult to optimize Petzval sum. Accordingly, it becomes disadvantageous to correct curvature of field or astigmatism.

When the lower limit of conditional expression (6) is set to 1.005 or more, it becomes possible to optimize Petzval sum and to excellently correct curvature of field, so that it is preferable. Furthermore, when the lower limit of conditional expression (6) is set to 1.010 or more, the effect of the present embodiment can be fully shown.

The second lens group G2 has an aperture stop S between the 21 lens component and the 22 lens component, and has a front lens group G2F having positive refractive power disposed to the object side of the aperture stop S and a rear lens group G2R having positive refractive power disposed to the image side of the aperture stop S.

The second lens group G2 may have a fixed stop for effectively blocking lower coma.

In a wide-angle lens according to the present embodiment, the first lens G1 may be fixed with respect to the image plane and the second lens group G2, which is relatively light and simple construction, and composed of relatively small number of lenses, may be moved in a body for focusing from infinity to a close object. In each example of the present embodiment, the front lens group G2F and the rear lens group G2R are moved with different moving amounts for focusing from infinity to a close object.

In the case of present embodiment, when the ratio of the moving amount of the front lens group G2F to that of the rear lens group G2R is set to 1:1.1 to 1.4 for focusing, it becomes possible to suppress variation in close-range aberrations in particular curvature of field and spherical aberration, so that it is desirable.

A wide-angle lens according to each Example of the present embodiment is explained below with reference to accompanying drawings.

EXAMPLE 1

FIG. 1 is a sectional view showing a lens configuration of a wide-angle lens according to Example 1. The wide-angle lens according to Example 1 is composed of, in order from an object, a first lens group G1 having positive refractive power, and a second lens group G2 having positive refractive power. The second lens group G2 is composed of, in order from the object, a front lens group G2F having positive refractive power, an aperture stop S for defining an f-number, and a rear lens group G2R having positive refractive power. The first lens group G1 is composed of, in order from the object, a 11 lens component L11 constructed by a negative lens having a convex surface facing the object, and a 12 lens component L12 composed of a cemented positive lens constructed by a thick double concave negative lens cemented with a double convex positive lens. The front lens group G2F is composed of a 21 lens component L21 that is a cemented positive lens constructed by, in order from the object, a double convex positive lens cemented with a double concave negative lens. The rear lens group G2R is composed of, in order from the object, a 22 lens component L22 constructed by a double concave negative lens, a 23 lens component L23 composed of a cemented positive lens constructed by a negative meniscus lens having a concave surface facing the object and an aspherical surface formed on the object side surface cemented with a positive meniscus lens having a convex surface facing the image, and a 24 lens component composed of a cemented positive lens constructed by a negative meniscus lens having a convex surface facing the object cemented with a double convex positive lens. Focusing from infinity to a close object is carried out by fixing the first lens group G1 with respect to the image plane, and moving the front lens group G2F and the rear lens group G2R to the object with different moving amounts. In Example 1, the ratio of the moving amount of the front lens group G2F to that of the rear lens group G2R for focusing is 1:1.18.

Various values associated with the wide-angle lens according to Example 1 are listed in Table 1.

In [Lens Data], the left most column "i" shows the lens surface number counted in order from the object side, the second column "r" shows a radius of curvature of the lens surface, the third column "d" shows a distance to the next surface, the fourth column "nd" shows a refractive index of the material at d-line (wavelength λ=587.6 nm), and the fifth column "vd" shows an Abbe number of the material at d-line (wavelength λ=587.6 nm). In the fifth column "nd" the refractive index of the air nd=1.000000 is omitted. In the second column "r", r=∞ denotes a plane surface. In the third column "d", Bf denotes a back focal length.

In [Aspherical Data], an aspherical surface is exhibited by the following expression:

$$X(y)=(y^2/r)/[1+[1-\kappa(y^2/r^2)]^{1/2}]+A3\times|y|^3+A4\times y^4+A6\times y^6+A8\times y^8+A10\times y^{10}+A12\times y^{12}$$

where y denotes a vertical height from the optical axis, X(y) denotes a sag amount which is a distance along the optical axis from the tangent surface at the vertex of the aspherical surface to the aspherical surface at the vertical height y from the optical axis, r denotes a radius of curvature of a reference sphere (a paraxial radius of curvature), κ denotes a conical coefficient, An denotes aspherical coefficient of n-th order, "E-n" denotes "×10$^{-n}$", for example, "1.234E-05" denotes "1.234×10$^{-5}$" and the position of an aspherical surface is expressed by attaching "*" to the right side of the surface number.

In [Specifications], f denotes a focal length of the optical system, FNO denotes an f-number, ω denotes a half angle of view in degrees, y denotes an image height, TL denotes a total lens length, Bf denotes a back focal length, and di denotes a variable distance at the surface number i.

In [Variable Distances], imaging magnification β, the object distance d0, and variable distances di with respect to each focusing state are shown.

In [Lens Group Data], the start surface number of each lens group and a focal length of each lens group are shown.

In [Values for Conditional Expressions], values for respective conditional expressions are shown.

In the tables for various values, "mm" is generally used for the unit of length such as the focal length, the radius of curvature and the distance to the next lens surface. However, since similar optical performance can be obtained by an optical system proportionally enlarged or reduced its dimension, the unit is not necessarily to be limited to "mm", and any other suitable unit can be used. The explanation of reference symbols is the same in the other Examples, so that duplicated explanations are omitted.

TABLE 1

[Lens Data]

| i | r | d | nd | vd |
|---|---|---|---|---|
| 1 | 115.1525 | 2.0000 | 1.816000 | 46.62 |
| 2 | 31.1674 | 9.0000 | | |

TABLE 1-continued

| | | | | |
|---|---|---|---|---|
| 3 | −215.8440 | 15.8500 | 1.516800 | 64.12 |
| 4 | 38.1486 | 10.5000 | 1.816000 | 46.62 |
| 5 | −101.0097 | d5 | | |
| 6 | 39.4576 | 10.3000 | 1.882997 | 40.76 |
| 7 | −52.1142 | 2.0000 | 1.717360 | 29.52 |
| 8 | 42.9666 | d8 | | |
| 9 | ∞ | 5.0000 | Aperture Stop S | |
| 10 | −28.2121 | 2.3000 | 1.728250 | 28.46 |
| 11 | 233.7456 | 1.6000 | | |
| 12* | −224.2964 | 2.5000 | 1.743300 | 49.32 |
| 13 | −1000.0000 | 5.5000 | 1.696800 | 55.52 |
| 14 | −38.4371 | 0.1000 | | |
| 15 | 309.0744 | 1.8000 | 1.575010 | 41.49 |
| 16 | 53.8750 | 9.5000 | 1.603001 | 65.44 |
| 17 | −30.9322 | d17(Bf) | | |

[Aspherical Data]

Surface Number: 12

K = 195.0000
A3 = −0.20873E−06
A4 = −1.24260E−05
A6 = 2.79980E−09
A8 = −5.17360E−11
A10 = 1.79730E−13
A12 = −0.89748E−16

[Specifications]

f = 36.000
FNO = 1.45
ω = 31.53
Y = 21.6
TL = 131.135
Bf = 38.02909

[Variable Distances]

| | Infinity | Close Range 1 | Close Range 2 |
|---|---|---|---|
| β | 0.00000 | −0.03333 | −0.19633 |
| d0 | ∞ | 1062.6389 | 168.8648 |
| d5 | 7.40434 | 6.32841 | 1.15510 |
| d8 | 7.75179 | 7.55812 | 6.62693 |
| d17(Bf) | 38.02909 | 39.29868 | 45.40319 |

[Lens Group Data]

| Group | i | focal length |
|---|---|---|
| G1 | 1 | 1063.59969 |
| G2F | 6 | 90.86801 |
| G2R | 10 | 56.15852 |

[Values for Conditional Expressions]

(1): f23/f24 = 1.424
(2): (r2 + r1)/(r2 − r1) = −0.271
(3): n22 = 1.728
(4): f/f1 = 0.03385
(5): Dn/D1 = 0.4244
(6): n24P/n24N = 1.018

Figure 2:
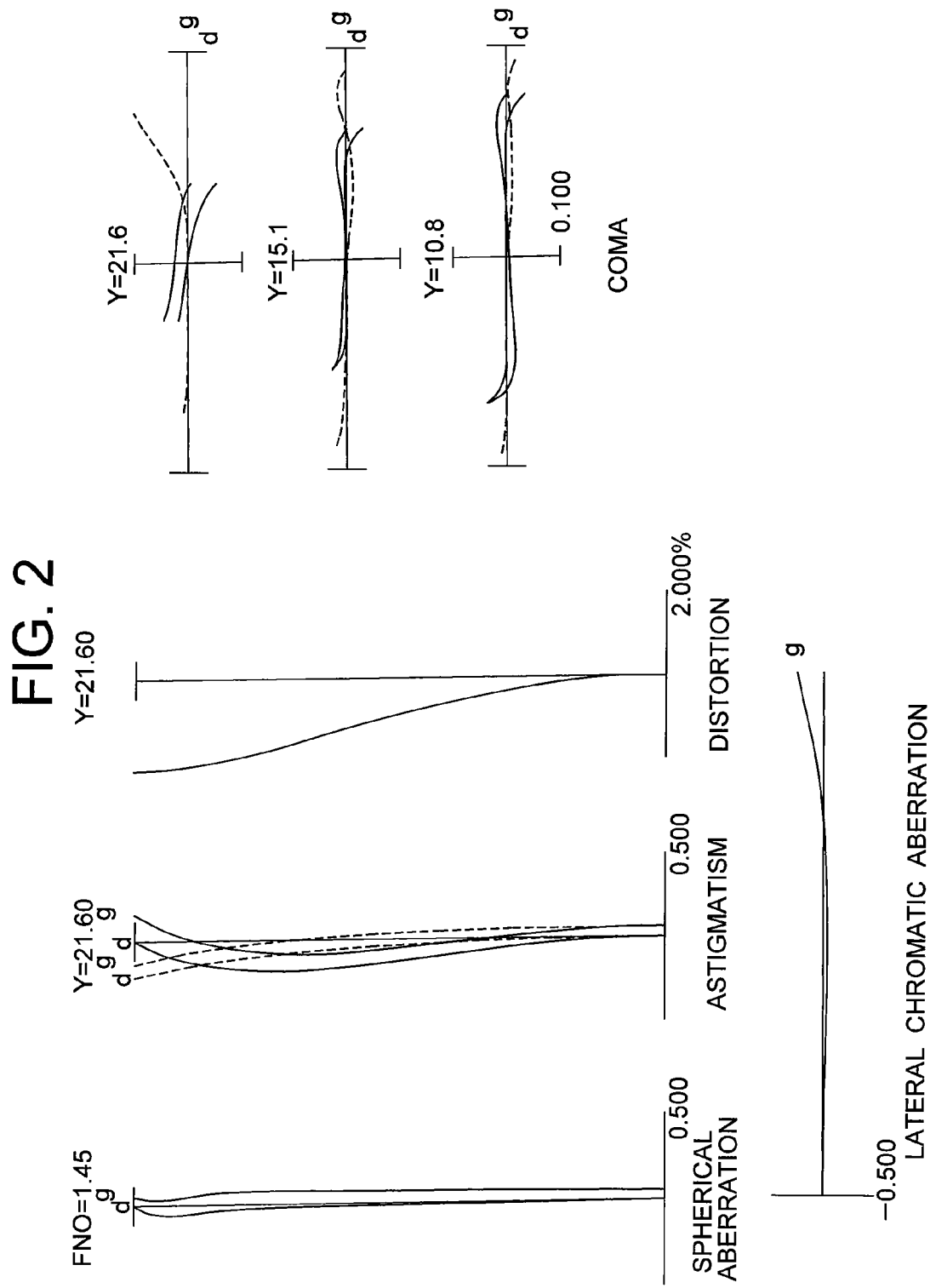
FIG. 2 is a graph showing various aberrations of the wide-angle lens according to Example 1 upon focusing on infinity.

FIG. 2 is a graph showing various aberrations of the wide-angle lens according to Example 1 upon focusing on infinity.

In respective graphs, FNO denotes an f-number, Y denotes an image height, d denotes aberration curve at d-line (wavelength λ=587.6 nm), and g denotes aberration curve at g-line (wavelength λ=435.8 nm). In graphs showing astigmatism, a solid line indicates a sagittal image plane, and a broken line indicates a meridional image plane. In graphs showing coma, a solid line denotes meridional coma, a broken line to the right side of the origin denotes sagittal coma generating in the meridional direction at d-line, and a broken line to the left side of the origin denotes sagittal coma generating in the sagittal direction at d-line.

As is apparent from the respective graphs, the wide-angle lens according to Example 1 shows superb optical performance as a result of good corrections to various aberrations.

EXAMPLE 2

Figure 3:
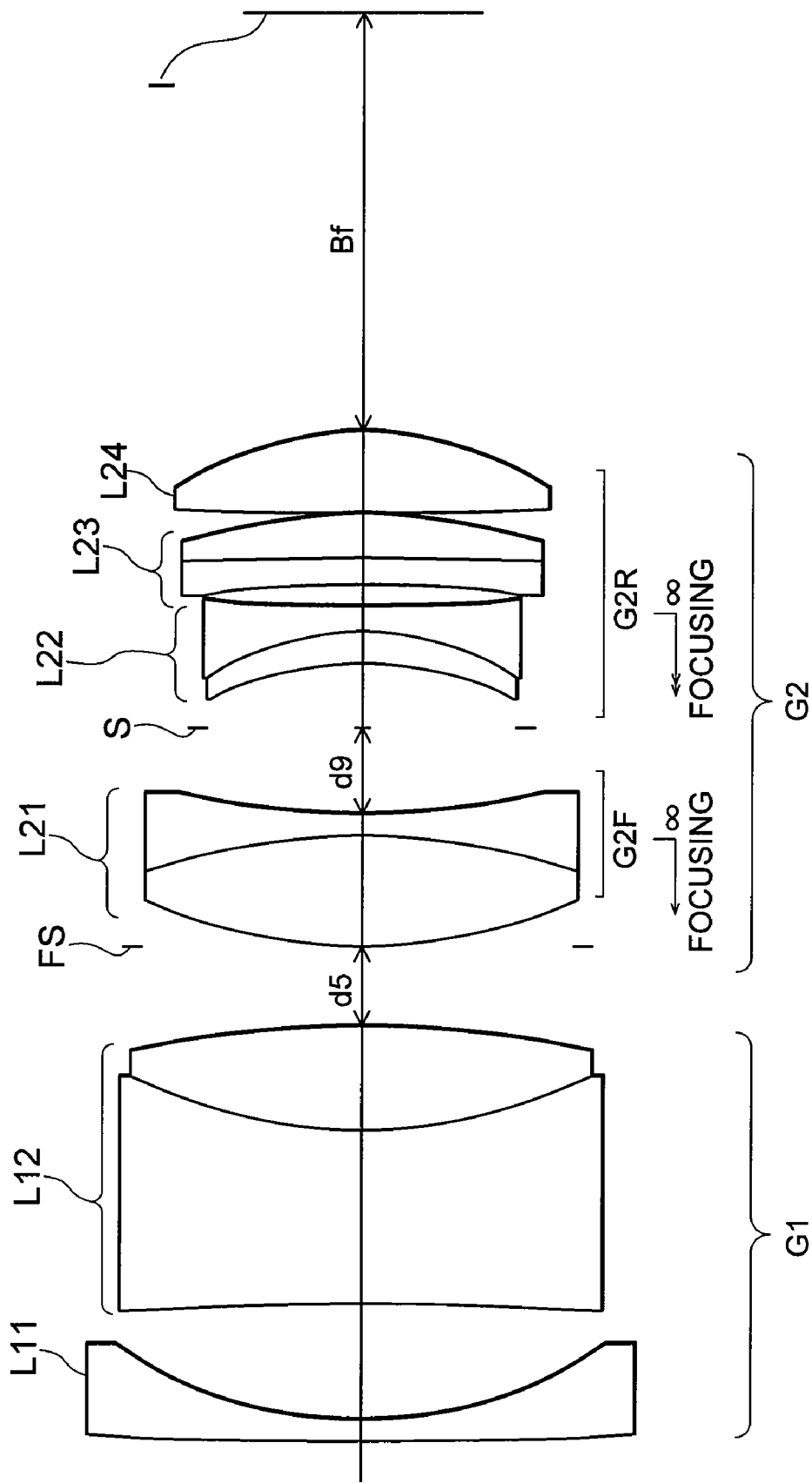
FIG. 3 is a sectional view showing a lens configuration of a wide-angle lens according to Example 2 upon focusing on infinity.

FIG. 3 is a sectional view showing a lens configuration of a wide-angle lens according to Example 2. The wide-angle lens according to Example 2 is composed of, in order from an object, a first lens group G1 having positive refractive power, and a second lens group G2 having positive refractive power. The second lens group G2 is composed of, in order from the object, a flare stopper FS for blocking lower coma flare, a front lens group G2F having positive refractive power, an aperture stop S for defining an f-number, and a rear lens group G2R having positive refractive power. The first lens group G1 is composed of, in order from the object, a 11 lens component L11 constructed by a negative lens having a convex surface facing the object, and a 12 lens component L12 composed of a cemented positive lens constructed by a thick double concave negative lens cemented with a double convex positive lens. The front lens group G2F is composed of a 21 lens component L21 that is a cemented positive lens constructed by, in order from the object, a double convex positive lens cemented with a double concave negative lens. The rear lens group G2R is composed of, in order from the object, a 22 lens component L22 that is a cemented negative lens constructed by a positive meniscus lens having a concave surface facing the object cemented with a double concave negative lens, a 23 lens component L23 composed of a cemented positive lens constructed by a negative meniscus lens having a concave surface facing the object and an aspherical surface formed on the object side surface cemented with a positive meniscus lens having a convex surface facing the image, and a 24 lens component L24 constructed by a double convex positive lens. Focusing from infinity to a close object is carried out by fixing the first lens group G1 with respect to the image plane, and moving the front lens group G2F and the rear lens group G2R to the object with different moving amounts. In Example 2, the ratio of the moving amount of the front lens group G2F to that of the rear lens group G2R for focusing is 1:1.2.

Various values associated with the wide-angle lens according to Example 2 are listed in Table 2.

TABLE 2

[Lens Data]

| i | r | d | nd | νd |
|---|---|---|---|---|
| 1 | 368.3548 | 2.0000 | 1.804000 | 46.57 |
| 2 | 37.5033 | 10.2832 | | |
| 3 | −451.8992 | 15.8500 | 1.516800 | 64.12 |
| 4 | 43.7784 | 9.5000 | 1.816000 | 46.62 |
| 5 | −104.9084 | d5 | | |
| 6 | ∞ | 0.0000 | Flare Stopper FS | |
| 7 | 43.9953 | 10.3000 | 1.882997 | 40.76 |
| 8 | −57.8881 | 2.0000 | 1.717360 | 29.52 |
| 9 | 68.4103 | d9 | | |
| 10 | ∞ | 6.0000 | Aperture Stop S | |
| 11 | −29.9403 | 3.0000 | 1.772499 | 49.60 |
| 12 | −25.3086 | 2.3000 | 1.805180 | 25.43 |
| 13 | 140.9460 | 2.0000 | | |
| 14* | −303.1323 | 2.5000 | 1.743300 | 49.32 |
| 15 | −1000.0000 | 4.0000 | 1.748100 | 52.28 |

TABLE 2-continued

| 16 | −55.7918 | 0.1000 | | |
| 17 | 283.4488 | 7.5000 | 1.748100 | 52.28 |
| 18 | −31.6703 | d18(Bf) | | |

[Aspherical Data]

Surface Number: 14

K = 373.9935
A3 = 0.00000E+00
A4 = −1.03900E−05
A6 = −5.42160E−09
A8 = 3.20470E−11
A10 = 0.00000E+00
A12 = 0.00000E+00

[Specifications]

f = 35.863
FNO = 1.45
ω = 31.63
Y = 21.6
TL = 130.580
Bf = 38.02972

[Variable Distances]

| | Infinity | Close Range 1 | Close Range 2 |
|---|---|---|---|
| β | 0.00000 | −0.03333 | −0.19454 |
| d0 | ∞ | 1058.1446 | 169.4204 |
| d5 | 7.35193 | 6.26188 | 1.08512 |
| d9 | 7.86480 | 7.64679 | 6.61144 |
| d18(Bf) | 38.02972 | 39.33778 | 45.54988 |

[Lens Group Data]

| Group | i | focal length |
|---|---|---|
| G1 | 1 | 2089.68452 |
| G2F | 7 | 73.75304 |
| G2R | 11 | 61.50882 |

[Values for Conditional Expressions]

Figure 4:
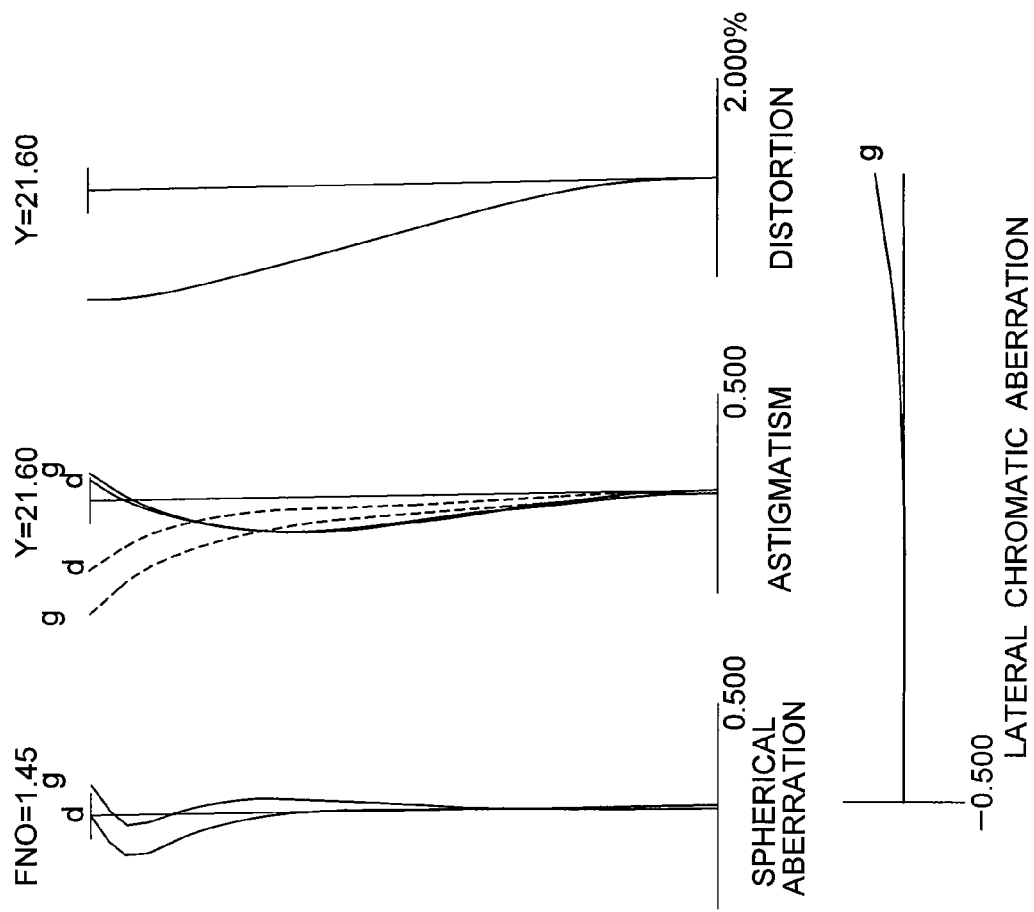
FIG. 4 is a graph showing various aberrations of the wide-angle lens according to Example 2 upon focusing on infinity.

(1): f23/f24 = 2.347
(2): (r2 + r1)/(r2 − r1) = −0.799
(3): n22 = 1.805
(4): f/f1 = 0.01716
(5): Dn/D1 = 0.4212
(6): n24P/n24N = not corresponding FIG. 4 is a graph showing various aberrations of the wide-angle lens according to Example 2 upon focusing on infinity.

As is apparent from the respective graphs, the wide-angle lens according to Example 2 shows superb optical performance as a result of good corrections to various aberrations.

EXAMPLE 3

Figure 5:
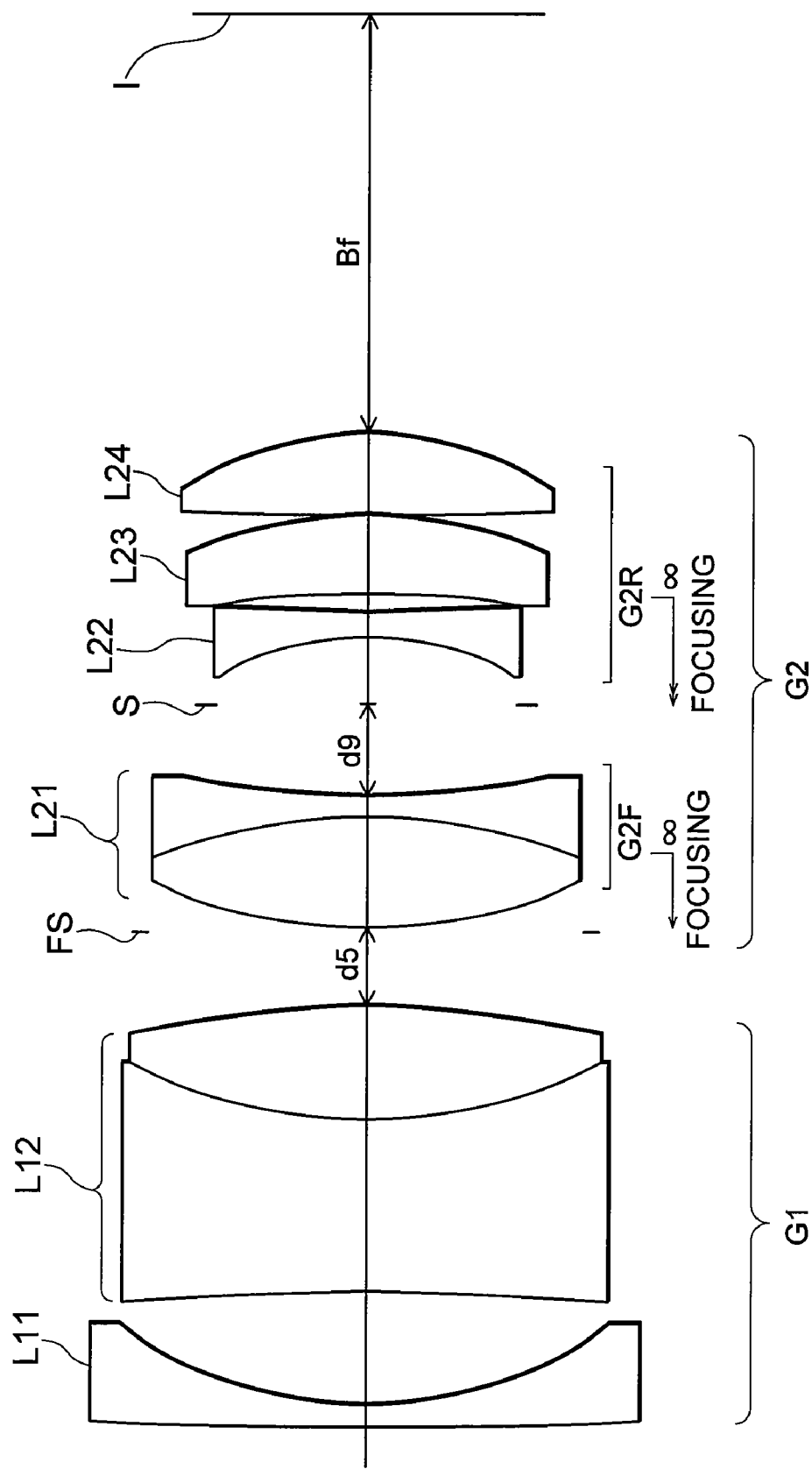
FIG. 5 is a sectional view showing a lens configuration of a wide-angle lens according to Example 3 upon focusing on infinity.

FIG. 5 is a sectional view showing a lens configuration of a wide-angle lens according to Example 3. The wide-angle lens according to Example 3 is composed of, in order from an object, a first lens group G1 having positive refractive power, and a second lens group G2 having positive refractive power. The second lens group G2 is composed of, in order from the object, a flare stopper FS for blocking lower coma flare, a front lens group G2F having positive refractive power, an aperture stop S for defining an f-number, and a rear lens group G2R having positive refractive power. The first lens group G1 is composed of, in order from the object, a 11 lens component L11 constructed by a negative lens having a convex surface facing the object, and a 12 lens component L12 composed of a cemented positive lens constructed by a thick double concave negative lens cemented with a double convex positive lens. The front lens group G2F is composed of a 21 lens component L21 that is a cemented positive lens constructed by, in order from the object, a double convex positive lens cemented with a double concave negative lens. The rear lens group G2R is composed of, in order from the object, a 22 lens component L22 constructed by a double concave negative lens, a 23 lens component L23 composed of a positive meniscus lens having a concave surface facing the object and an aspherical surface formed on the object side surface, and a 24 lens component L24 constructed by a double convex positive lens.

Focusing from infinity to a close object is carried out by fixing the first lens group G1 with respect to the image plane, and moving the front lens group G2F and the rear lens group G2R to the object with different moving amounts. In Example 3, the ratio of the moving amount of the front lens group G2F to that of the rear lens group G2R for focusing is 1:1.2.

Various values associated with the wide-angle lens according to Example 3 are listed in Table 3.

TABLE 3

[Lens Data]

| i | r | d | nd | νd |
|---|---|---|---|---|
| 1 | 288.3227 | 2.0000 | 1.804000 | 46.57 |
| 2 | 36.4653 | 10.2500 | | |
| 3 | −529.3405 | 15.8500 | 1.516800 | 64.12 |
| 4 | 42.7147 | 10.5000 | 1.816000 | 46.62 |
| 5 | −108.9838 | d5 | | |
| 6 | ∞ | 0.0000 | Flare Stopper FS | |
| 7 | 43.2020 | 10.3000 | 1.882997 | 40.76 |
| 8 | −58.6098 | 2.0000 | 1.717360 | 29.52 |
| 9 | 65.8121 | d9 | | |
| 10 | ∞ | 6.0000 | Aperture Stop S | |
| 11 | −27.7348 | 2.3000 | 1.846660 | 23.78 |
| 12 | 131.7181 | 1.8000 | | |
| 13 | −285.6600 | 7.3000 | 1.693500 | 53.18 |
| 14 | −42.1982 | 0.1000 | | |
| 15 | 347.7121 | 7.5000 | 1.748100 | 52.28 |
| 16 | −31.1227 | d16(Bf) | | |

[Aspherical Data]

Surface Number: 13

K = 323.5315
A3 = 0.00000E+00
A4 = −1.17610E−05
A6 = −7.77510E−09
A8 = 3.17450E−11
A10 = 0.00000E+00
A12 = 0.00000E+00

[Specifications]

f = 35.863
FNO = 1.45
ω = 31.63
Y = 21.6
TL = 130.040
Bf = 38.02739

[Variable Distances]

| | Infinity | Close Range 1 | Close Range 2 |
|---|---|---|---|
| β | 0.00000 | −0.03333 | −0.19377 |
| d0 | ∞ | 1057.9657 | 169.9604 |
| d5 | 7.33728 | 6.24723 | 1.09482 |
| d9 | 8.77498 | 8.55697 | 7.52649 |
| d16(Bf) | 38.02739 | 39.33545 | 45.51834 |

TABLE 3-continued

[Lens Group Data]

| Group | i | focal length |
|---|---|---|
| G1 | 1 | 2089.68452 |
| G2F | 7 | 73.75304 |
| G2R | 11 | 61.50882 |

[Values for Conditional Expressions]

| | |
|---|---|
| (1): f23/f24 = | 1.831 |
| (2): (r2 + r1)/(r2 − r1) = | −0.836 |
| (3): n22 = | 1.847 |
| (4): f/f1 = | 0.01716 |
| (5): Dn/D1 = | 0.4106 |
| (6): n24P/n24N = | not corresponding |

Figure 6:
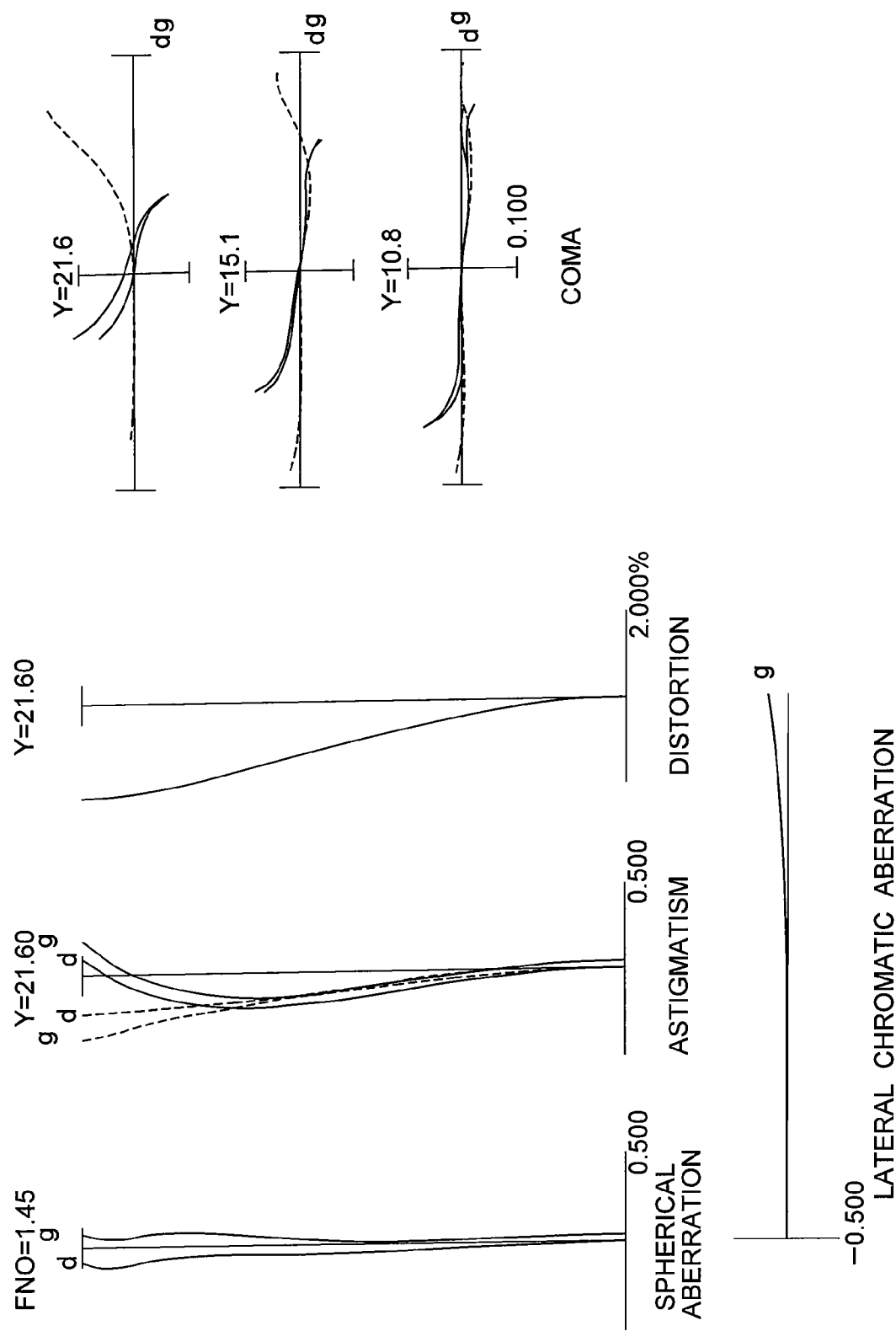
FIG. 6 is a graph showing various aberrations of the wide-angle lens according to Example 3 upon focusing on infinity.

FIG. 6 is a graph showing various aberrations of the wide-angle lens according to Example 3 upon focusing on infinity.

As is apparent from the respective graphs, the wide-angle lens according to Example 3 shows superb optical performance as a result of good corrections to various aberrations.

EXAMPLE 4

Figure 7:
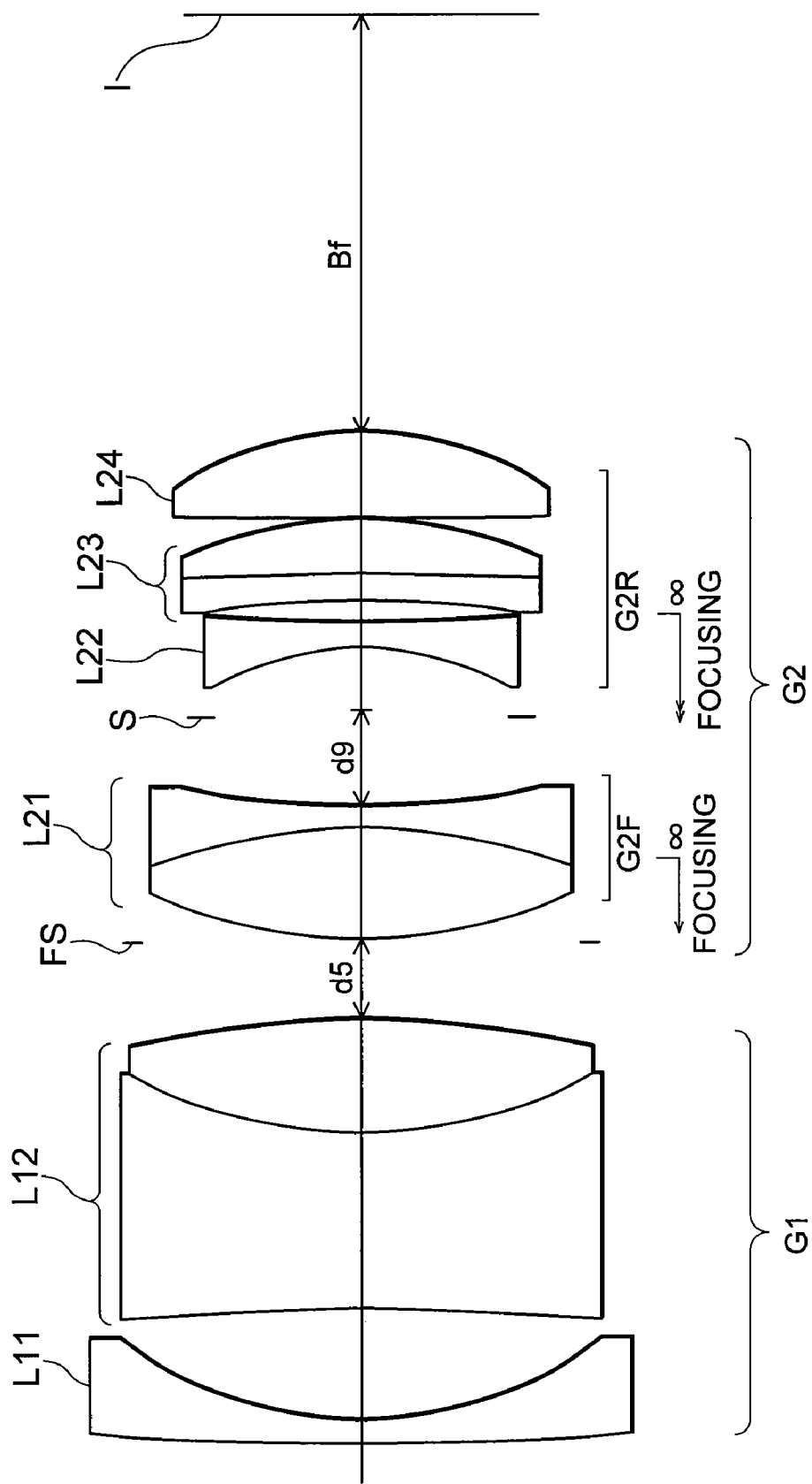
FIG. 7 is a sectional view showing a lens configuration of a wide-angle lens according to Example 4 upon focusing on infinity.

FIG. 7 is a sectional view showing a lens configuration of a wide-angle lens according to Example 4. The wide-angle lens according to Example 4 is composed of, in order from an object, a first lens group G1 having positive refractive power, and a second lens group G2 having positive refractive power. The second lens group G2 is composed of, in order from the object, a flare stopper FS for blocking lower coma flare, a front lens group G2F having positive refractive power, an aperture stop S for defining an f-number, and a rear lens group G2R having positive refractive power. The first lens group G1 is composed of, in order from the object, a 11 lens component L11 constructed by a negative lens having a convex surface facing the object, and a 12 lens component L12 composed of a cemented positive lens constructed by a thick, double concave negative lens cemented with a double convex positive lens. The front lens group G2F is composed of a 21 lens component L21 that is a cemented positive lens constructed by, in order from the object, a double convex positive lens cemented with a double concave negative lens. The rear lens group G2R is composed of, in order from the object, a 22 lens component L22 constructed by a double concave negative lens, a 23 lens component L23 composed of a cemented positive lens constructed by a negative meniscus lens having a concave surface facing the object and an aspherical surface formed on the object side surface cemented with a positive meniscus lens having a convex surface facing the image, and a 24 lens component L24 constructed by a double convex positive lens.

Focusing from infinity to a close object is carried out by fixing the first lens group G1 with respect to the image plane, and moving the front lens group G2F and the rear lens group G2R to the object with different moving amounts. In Example 4, the ratio of the moving amount of the front lens group G2F to that of the rear lens group G2R for focusing is 1:1.2.

Various values associated with the wide-angle lens according to Example 4 are listed in Table 4.

TABLE 4

[Lens Data]

| i | r | d | nd | vd |
|---|---|---|---|---|
| 1 | 254.9621 | 2.0000 | 1.804000 | 46.57 |
| 2 | 36.2067 | 10.2500 | | |
| 3 | −397.1159 | 15.8500 | 1.516800 | 64.12 |
| 4 | 42.6798 | 10.5000 | 1.816000 | 46.62 |
| 5 | −107.3694 | d5 | | |
| 6 | ∞ | 0.0000 | Flare Stopper FS | |
| 7 | 43.7683 | 10.3000 | 1.882997 | 40.76 |
| 8 | −62.1001 | 2.0000 | 1.717360 | 29.52 |
| 9 | 68.9057 | d9 | | |
| 10 | ∞ | 6.0000 | Aperture Stop S | |
| 11 | −28.8520 | 2.3000 | 1.846660 | 23.78 |
| 12 | 116.7762 | 2.0000 | | |
| 13* | −316.3150 | 2.5000 | 1.743300 | 49.32 |
| 14 | −1000.0000 | 5.0000 | 1.748100 | 52.28 |
| 15 | −44.0819 | 0.1000 | | |
| 16 | 325.3134 | 7.8500 | 1.748100 | 52.28 |
| 17 | −32.4616 | d17(Bf) | | |

[Aspherical Data]

Surface Number: 13

K = 392.0348
A3 = 0.00000E+00
A4 = −9.82060E−06
A6 = −6.07170E−09
A8 = 3.30230E−11
A10 = 0.00000E+00
A12 = 0.00000E+00

[Specifications]

f = 35.863
FNO = 1.45
ω = 31.61
Y = 21.6
TL = 130.685
Bf = 38.02747

[Variable Distances]

| | Infinity | Close Range 1 | Close Range 2 |
|---|---|---|---|
| β | 0.00000 | −0.03333 | −0.19433 |
| d0 | ∞ | 1057.8421 | 169.3153 |
| d5 | 7.33876 | 6.24871 | 1.07866 |
| d9 | 8.66850 | 8.45049 | 7.41648 |
| d17(Bf) | 38.02747 | 39.33553 | 45.53958 |

[Lens Group Data]

| Group | i | focal length |
|---|---|---|
| G1 | 1 | 2089.68452 |
| G2F | 7 | 73.75304 |
| G2R | 11 | 61.50882 |

[Values for Conditional Expressions]

| | |
|---|---|
| (1): f23/f24 = | 1.698 |
| (2): (r2 + r1)/(r2 − r1) = | −0.819 |
| (3): n22 = | 1.847 |
| (4): f/f1 = | 0.01716 |
| (5): Dn/D1 = | 0.4106 |
| (6): n24P/n24N = | not corresponding |

Figure 8:
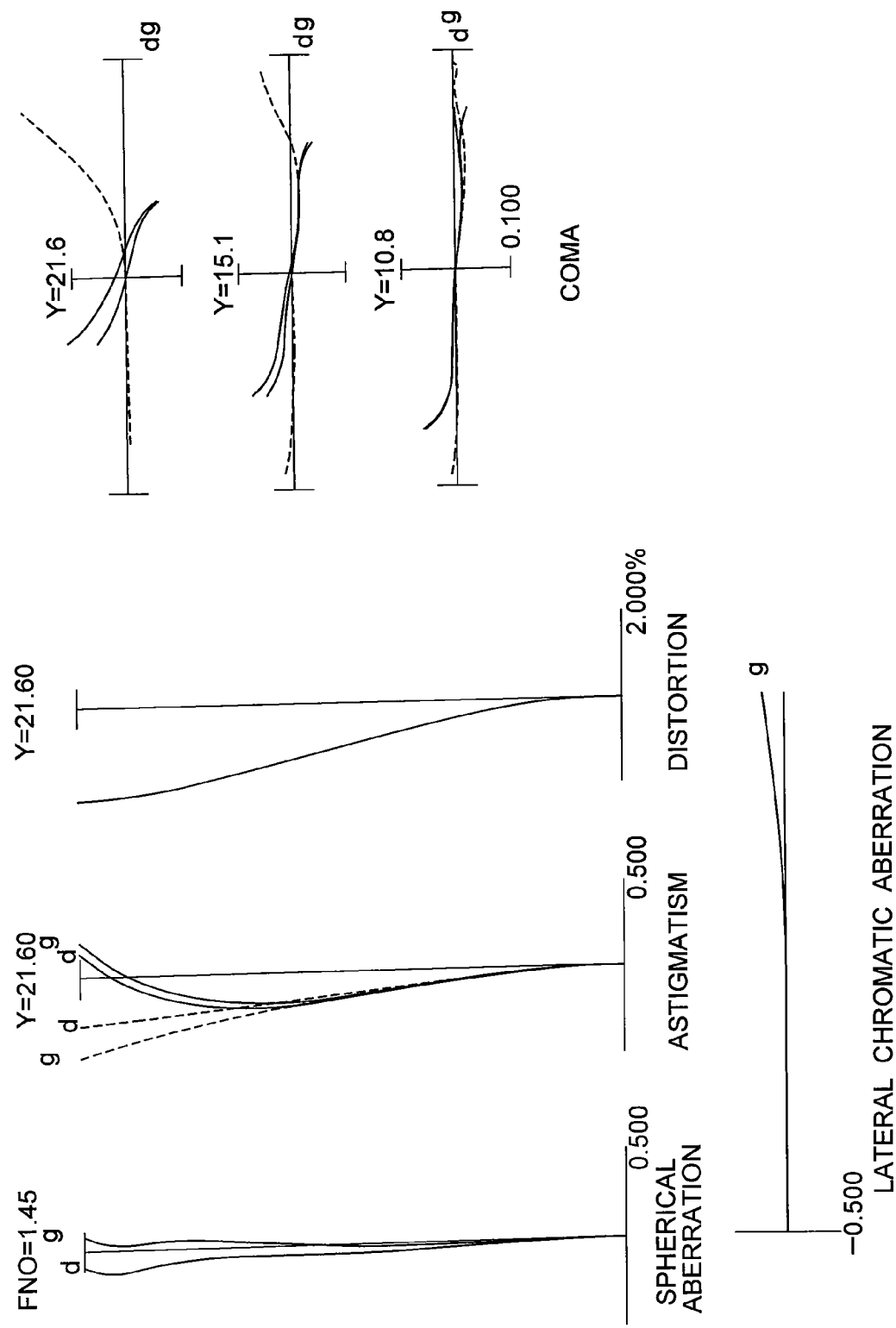
FIG. 8 is a graph showing various aberrations of the wide-angle lens according to Example 4 upon focusing on infinity.

FIG. 8 is a graph showing various aberrations of the wide-angle lens according to Example 4 upon focusing on infinity.

As is apparent from the respective graphs, the wide-angle lens according to Example 4 shows superb optical performance as a result of good corrections to various aberrations.

According to each example described above, it becomes possible to realize a large aperture wide-angle lens having an angle of view 2ω of 63 degrees or more, f-number of about 1.45, high optical performance with sufficiently suppressing variation in the shape of spherical aberration with respect to wavelength (spherical aberration in colors), astigmatism, and sagittal coma flare.

Although a wide-angle lens with a two-lens-group configuration is shown as each Example of the present embodiment, the configuration of a wide-angle lens is not limited to this, the present embodiment can be applied to other lens-group configurations such as a three-lens-group configuration. Moreover, a lens group having weak refractive power (such as a teleconverter lens and a wide-converter lens) may be disposed to the object side of the first lens group G1. A lens group having weak refractive power may be disposed to the image side of the second lens group G2. An optical element having no refractive power or weak refractive power such as a filter or an aperture member may be disposed between respective lenses.

In each Example, in order to carry out focusing from an infinity object to a close object, a portion of a lens group, the whole lens, a single lens group, or a plurality of lens groups may be moved along the optical axis as a focusing lens group.

The focusing lens group(s) may be used for auto focus, and suitable for being driven by a motor such as an ultrasonic motor. In particular, it is most preferable to use the front lens group G2F and the rear lens group G2R.

A lens group or a portion of a lens group may be sifted in a direction perpendicular to the optical axis as a vibration reduction lens group for correcting an image blur caused by a camera shake. It is particularly preferable that the second lens group or the rear lens group G2R is used as a vibration reduction lens group.

Moreover, any lens surface may be an aspherical surface. The aspherical surface may be fabricated by a fine grinding process, a glass molding process that a glass material is formed into an aspherical shape by a mold, or a compound type process that a resin material is formed into an aspherical shape on a glass surface.

Although an aperture stop is preferably disposed between the front lens group G2F and the rear lens group G2R, the function may be substituted by a lens frame without disposing a member as an aperture stop.

An antireflection coating having high transmittance over a broad wavelength range may be applied to each lens surface to reduce flare or ghost images, so that high optical performance with a high contrast can be attained.

Figure 9:
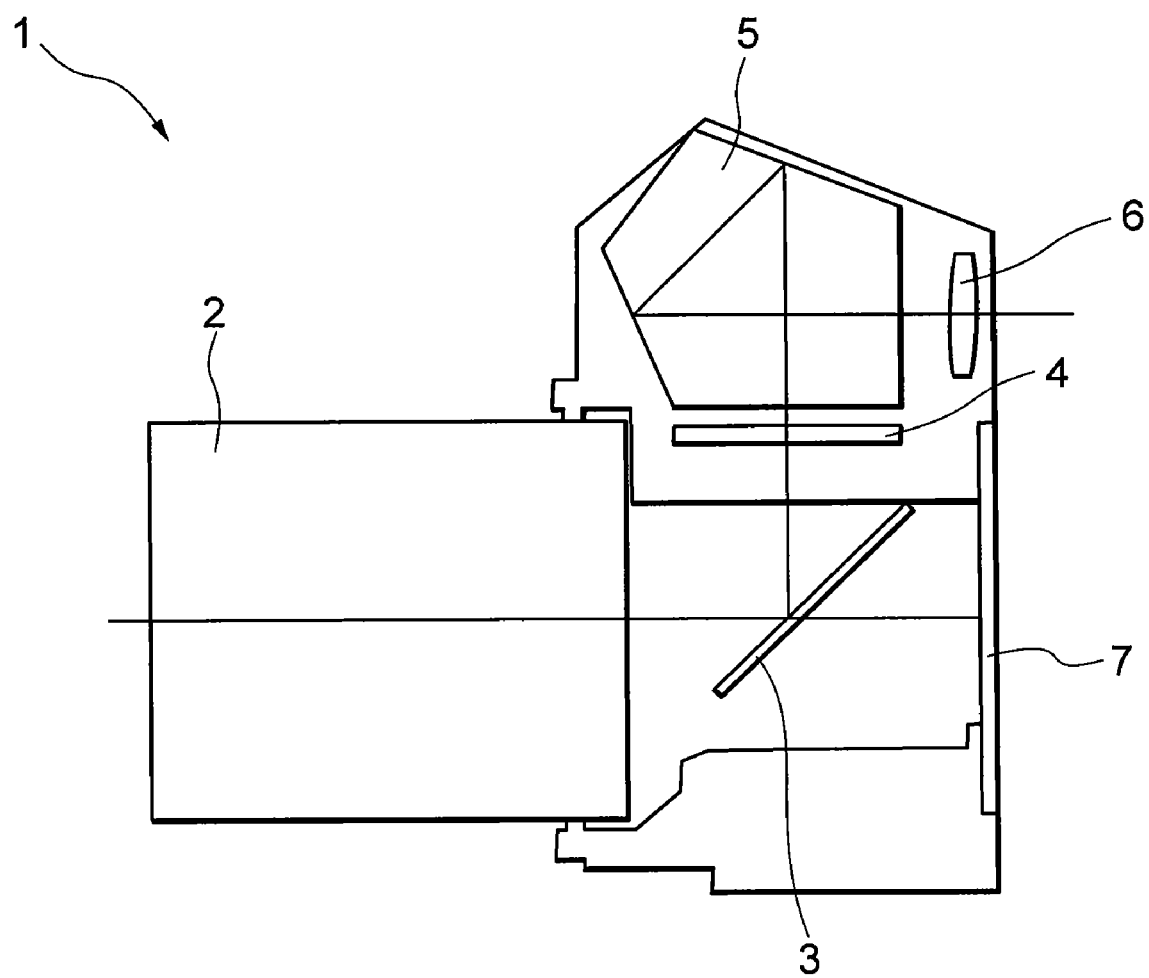
FIG. 9 is a diagram showing an imaging apparatus (camera) equipped with the wide-angle lens according to Example 1.

FIG. 9 is a diagram showing an imaging apparatus (camera) equipped with the wide-angle lens according to Example 1.

As shown in FIG. 9, the camera 1 is a single-lens reflex digital camera equipped with the wide-angle lens according to Example 1 as an image-taking lens 2.

In the camera 1, light emitted from an object (not shown) is converged by an image-taking lens 2, and focused on a focusing screen 4 through a quick return mirror 3. The object image focused on the focusing screen 4 is reflected a plurality of times by a pentagonal roof prism 5, and led to an eyepiece 6. Therefore, a photographer can observe the object image as an erected image through the eyepiece 6.

When the photographer presses a shutter release button (not shown), the quick return mirror 3 is retracted from an optical path, and the light from the object (not shown) reaches an imaging device 7. Accordingly, light emitted from the object is captured by the imaging device 7 and stored in a memory (not shown) as an object image. In this manner, the photographer can take a picture of an object by the camera 1.

The wide-angle lens according to Example 1 installed in the camera 1 as an image-taking lens 2 realizes a large aperture wide-angle lens with sufficiently suppressed sagittal coma flare by means of the characteristic lens configuration described in Example 1. Accordingly, the camera 1 makes it possible to realize an imaging apparatus capable of taking a picture of a large aperture wide-angle lens with sufficiently suppressed sagittal coma flare.

Although the above-described example is shown a case composing a camera 1 equipped with the wide-angle lens according to Example 1, it is needless to say that the similar effect can be obtained by a camera equipped with a wide-angle lens according to any one of Examples 2 through 4 of the present embodiment.

The present embodiment only shows a specific example for the purpose of better understanding of the present invention. Accordingly, it is needless to say that the invention in its broader aspect is not limited to the specific details and representative devices shown and described herein, and various modifications may be made without departing from the spirit or scope of the general inventive concept as defined by the appended claims and their equivalents.

What is clamed is:

1. A wide-angle lens comprising, in order from an object:
a first lens group having positive refractive power; and
a second lens group having positive refractive power;
the second lens group including, in order from the object, a 2A lens component having positive refractive power and movable for focusing on the object, a 2B lens component having negative refractive power and movable for focusing on the object, a 2C lens component having positive refractive power and movable for focusing on the object, and a 2D lens component having positive refractive power and movable for focusing on the object, and
the following conditional expression being satisfied:

$$1.00 < f23/f24 < 5.00$$

where f23 denotes a focal length of the 2C lens component, and f24 denotes a focal length of the 2D lens component.

2. The wide-angle lens according to claim 1, wherein at least one lens component of the 2B lens component, the 2C lens component, and the 2D lens component is a single lens or a cemented lens.

3. The wide-angle lens according to claim 1, wherein the 2A lens component is a cemented lens constructed by a positive lens and a negative lens.

4. The wide-angle lens according to claim 1, wherein the first lens group includes, in order from the object, a 1A lens component having negative refractive power, and a 1B lens component having positive refractive power.

5. The wide-angle lens according to claim 1, wherein the first lens group includes, in order from the object, a 1A lens component having negative refractive power, and a 1B lens component having positive refractive power, the 1A lens component constructed by a negative lens.

6. The wide-angle lens according to claim 1, wherein the first lens group includes, in order from the object, a 1A lens component having negative refractive power, and a 1B lens component having positive refractive power, and
the 1B lens component is a cemented lens constructed by a negative lens cemented with a positive lens.

7. The wide-angle lens according to claim 1, wherein the 2D lens component has a positive lens and the following conditional expression is satisfied:

$$-1.00 < (r2+r1)/(r2-r1) \leq 0.00$$

where r1 denotes a radius of curvature of the object side surface of the positive lens in the 2D lens component, and r2 denotes a radius of curvature of the image side surface of the positive lens in the 2D lens component.

8. The wide-angle lens according to claim 1, wherein the 2C lens component includes an aspherical surface.

9. The wide-angle lens according to claim 8, wherein the 2C lens component is a cemented lens.

10. The wide-angle lens according to claim 1, wherein the 2B lens component has a negative lens and the following conditional expression is satisfied:

$$1.51<n22<1.85$$

where n22 denotes a refractive index of the negative lens in the 2B lens component at d-line in which wavelength λ=587.6 nm.

11. The wide-angle lens according to claim 1, wherein the first lens group includes, in order from the object, a 1A lens component composed of a negative lens, and a 1B lens component composed of a cemented positive lens constructed by a negative lens cemented with a positive lens, and the following conditional expression is satisfied:

$$0.012<f/f1<0.100$$

where f1 denotes a focal length of the first lens group, and f denotes a focal length of the wide-angle lens.

12. The wide-angle lens according to claim 1, wherein the first lens group includes, in order from the object, a 1A lens component having negative refractive power, and a 1B lens component having positive refractive power and including at least one negative lens, and the following conditional expression is satisfied:

$$0.31<Dn/D1<0.50$$

where D1 denotes a thickness along an optical axis of the first lens group, and Dn denotes a thickness along the optical axis of the negative lens in the 1B lens component.

13. The wide-angle lens according to claim 1, wherein the 2D lens component is a cemented lens.

14. The wide-angle lens according to claim 13, wherein the 2D lens component includes a negative lens and a positive lens, and the following conditional expression is satisfied:

$$1.000<n24P/n24N<1.200$$

where n24N denotes a refractive index of the negative lens in the 2D lens component at d-line in which wavelength λ=587.6 nm, and n24P denotes a refractive index of the positive lens in the 2D lens component at d-line in which wavelength λ=587.6 nm.

15. The wide-angle lens according to claim 1, wherein an aperture stop is disposed between the 2A lens component and the 2B lens component in the second lens group.

16. The wide-angle lens according to claim 15, wherein the second lens group includes a front lens group having positive refractive power disposed to the object side of the aperture stop, and a rear lens group having positive refractive power disposed to the image side of the aperture stop, and focusing from an infinity object to a close object is carried out by moving the front lens group and the rear lens group to the object with different moving amounts with each other.

17. The wide-angle lens according to claim 1, wherein a plurality of lens components among the 2A lens component, the 2B lens component, the 2C lens component and the 2D lens component are moved in a body upon focusing on the object.

18. An imaging apparatus equipped with the wide-angle lens according to claim 1.

19. A method for forming an image of an object by a wide-angle lens comprising steps of:

providing the wide-angle lens including, in order from the object, a first lens group having positive refractive power, and a second lens group having positive refractive power, the second lens group including, in order from the object, a 2A lens component having positive refractive power, a 2B lens component having negative refractive power, a 2C lens component having positive refractive power, and a 2D lens component having positive refractive power;

moving the 2A lens component, the 2B component, the 2C component and 2D component upon focusing; and satisfying the following conditional expression:

$$1.00<f23/f24<5.00$$

where f23 denotes a focal length of the 2C lens component, and f24 denotes a focal length of the 2D lens component.

20. The method according to claim 19, wherein at least one lens component of the 2B lens component, the 2C lens component, and the 2D lens component is a single lens or a cemented lens.

21. The method according to claim 19, wherein the 2A lens component is a cemented lens constructed by a positive lens and a negative lens.

22. The method according to claim 19, wherein the first lens group includes, in order from the object, a 1A lens component having negative refractive power, and a 1B lens component having positive refractive power.

23. The method according to claim 19, wherein the first lens group includes, in order from the object, a 1A lens component having negative refractive power, and a 1B lens component having positive refractive power, the 1A lens component constructed by a negative lens.

24. The method according to claim 19, wherein the first lens group includes, in order from the object, a 1A lens component having negative refractive power, and a 1B lens component having positive refractive power, and the 1B lens component is a cemented lens constructed by a negative lens cemented with a positive lens.

25. The method according to claim 19, wherein the 2D lens component has a positive lens and the following conditional expression is satisfied:

$$-1.00<(r2+r1)/(r2-r1)\leq0.00$$

where r1 denotes a radius of curvature of the object side surface of the positive lens in the 2D lens component, and r2 denotes a radius of curvature of the image side surface of the positive lens in the 2D lens component.

26. The method according to claim 19, wherein the 2C lens component includes an aspherical surface.

27. The method according to claim 19, wherein the 2C lens component is a cemented lens.

28. The method according to claim 19, wherein the 2B lens component has a negative lens and the following conditional expression is satisfied:

$$1.51<n22<1.85$$

where n22 denotes a refractive index of the negative lens in the 2B lens component at d-line in which wavelength λ=587.6 nm.

29. The method according to claim 19, wherein the first lens group includes, in order from the object, a 1A lens component composed of a negative lens, and a 1B lens component composed of a cemented positive lens constructed by a negative lens cemented with a positive lens, and the following conditional expression is satisfied:

$$0.012 < f/f1 < 0.100$$

where f1 denotes a focal length of the first lens group, and f denotes a focal length of the wide-angle lens.

30. The method according to claim 19, wherein the first lens group includes, in order from the object, a 1A lens component having negative refractive power, and a 1B lens component having positive refractive power and including at least one negative lens, and the following conditional expression is satisfied:

$$0.31 < Dn/D1 < 0.50$$

where D1 denotes a thickness along an optical axis of the first lens group, and Dn denotes a thickness along the optical axis of the negative lens in the 1B lens component.

31. The method according to claim 19, wherein the 2D lens component is a cemented lens.

32. The method according to claim 31, wherein the 2D lens component includes a negative lens and a positive lens, and the following conditional expression is satisfied:

$$1.000 < n24P/n24N < 1.200$$

where n24N denotes a refractive index of the negative lens in the 2D lens component at d-line in which wavelength $\lambda = 587.6$ nm, and n24P denotes a refractive index of the positive lens in the 2D lens component at d-line in which wavelength $\lambda = 587.6$ nm.

33. The method according to claim 31, wherein an aperture stop is disposed between the 2A lens component and the 2B lens component in the second lens group.

34. The method according to claim 33, wherein the second lens group includes a front lens group having positive refractive power disposed to the object side of the aperture stop, and a rear lens group having positive refractive power disposed to the image side of the aperture stop, and focusing from an infinity object to a close object is carried out by moving the front lens group and the rear lens group to the object with different moving amounts with each other.

35. The method according to claim 19, wherein a plurality of lens components among the 2A lens component, the 2B lens component, the 2C lens component and the 2D lens component are moved in a body upon focusing on the object.

36. A wide-angle lens comprising, in order from an object:
a first lens group having positive refractive power; and
a second lens group having positive refractive power;
the second lens group including, in order from the object, a first lens component having positive refractive power, a second lens component having negative refractive power, a third lens component having positive refractive power, and a fourth lens component having positive refractive power;
at least one lens of the second lens group being movable for focusing on the object, and the following conditional expression being satisfied:

$$1.00 < f23/f24 < 5.00$$

where f23 denotes a focal length of the third lens component, and f24 denotes a focal length of the fourth lens component.

37. A method for manufacturing a wide-angle lens including, in order from an object, a first lens group having positive refractive power, and a second lens group having positive refractive power, the method comprising steps of:
providing the second lens group comprising, in order from the object, a first lens component having positive refractive power, a second lens component having negative refractive power, a third lens component having positive refractive power, and a fourth lens component having positive refractive power;
moving at least one lens of the second lens group upon focusing; and
satisfying the following conditional expression:

$$1.00 < f23/f24 < 5.00$$

where f23 denotes a focal length of the third lens component, and f24 denotes a focal length of the fourth lens component.

* * * * *